(12) United States Patent
Hiraki et al.

(10) Patent No.: US 9,162,178 B2
(45) Date of Patent: *Oct. 20, 2015

(54) COMPOSITION FOR FORMATION OF CARBON DIOXIDE SEPARATION MEMBRANE, CARBON DIOXIDE SEPARATION MEMBRANE AND PROCESS FOR PRODUCTION THEREOF, AND CARBON DIOXIDE SEPARATION APPARATUS

(71) Applicant: FUJIFILM CORPORATION, Minato-ku, Tokyo (JP)

(72) Inventors: Daisuke Hiraki, Kanagawa (JP); Yusuke Mochizuki, Kanagawa (JP); Kazuki Yamazaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 103 days.

This patent is subject to a terminal disclaimer.

(21) Appl. No.: 13/933,127

(22) Filed: Jul. 2, 2013

(65) Prior Publication Data

US 2013/0284022 A1     Oct. 31, 2013

Related U.S. Application Data

(63) Continuation of application No. PCT/JP2011/076565, filed on Nov. 17, 2011.

(30) Foreign Application Priority Data

| Jan. 12, 2011 | (JP) | 2011-004274 |
| Mar. 25, 2011 | (JP) | 2011-068245 |
| Jul. 29, 2011 | (JP) | 2011-167488 |

(51) Int. Cl.
*B01D 53/22* (2006.01)
*B01D 67/00* (2006.01)
(Continued)

(52) U.S. Cl.
CPC .......... *B01D 53/228* (2013.01); *B01D 67/0002* (2013.01); *B01D 67/0011* (2013.01);
(Continued)

(58) Field of Classification Search
CPC ...... B01D 53/228; B01D 63/08; B01D 53/22; B01D 67/0002; B01D 67/0011; B01D 69/142; B01D 2257/504; B01D 2323/30; B01D 2323/42; C01B 3/503; C01B 2203/0475; C08L 5/12; C08L 29/04; C08L 33/02; C08L 67/00; C08L 101/14; C08K 2003/262; Y02C 10/10

See application file for complete search history.

(56) References Cited

U.S. PATENT DOCUMENTS 3,396,510 A * 8/1968 Ward, III et al. .................. 95/44
4,985,147 A * 1/1991 Mochizuki et al. ...... 210/500.27
(Continued)

FOREIGN PATENT DOCUMENTS

| EP | 2239048 A | 10/2010 |
| JP | 7-112122 A | 5/1995 |

(Continued)

OTHER PUBLICATIONS

Machine Translation of JP 07102310B Nov. 8, 1995 Okabe et al.*

(Continued)

*Primary Examiner* — Jason M Greene
*Assistant Examiner* — Anthony Shumate
(74) *Attorney, Agent, or Firm* — SOLARIS Intellectual Property Group, PLLC

(57) ABSTRACT

A composition for forming a carbon dioxide separation membrane, which includes a water-absorbing polymer, a carbon dioxide carrier, and a polysaccharide, is disclosed.

22 Claims, 5 Drawing Sheets

(51) Int. Cl.

| | |
|---|---|
| *B01D 69/14* | (2006.01) |
| *C08L 67/00* | (2006.01) |
| *C08L 5/12* | (2006.01) |
| *C08L 101/14* | (2006.01) |
| *C08L 33/02* | (2006.01) |
| *C08L 29/04* | (2006.01) |
| *C08K 3/26* | (2006.01) |

(52) U.S. Cl.
CPC ............... *B01D69/142* (2013.01); *C08L 5/12* (2013.01); *C08L 29/04* (2013.01); *C08L 33/02* (2013.01); *C08L 67/00* (2013.01); *C08L 101/14* (2013.01); *B01D 2257/504* (2013.01); *B01D 2323/30* (2013.01); *B01D 2323/42* (2013.01); *C08K 2003/262* (2013.01); *Y02C 10/10* (2013.01)

(56) References Cited

U.S. PATENT DOCUMENTS

| | | | | |
|---|---|---|---|---|
| 5,445,669 | A * | 8/1995 | Nakabayashi et al. | 96/5 |
| 5,611,843 | A * | 3/1997 | Ho | 95/51 |
| 6,261,679 | B1 * | 7/2001 | Chen et al. | 428/317.9 |
| 6,603,054 | B2 * | 8/2003 | Chen et al. | 604/369 |
| 7,318,854 | B2 * | 1/2008 | Sirkar | 95/45 |
| 2001/0024716 | A1 * | 9/2001 | Chen et al. | 428/317.9 |
| 2003/0220039 | A1 * | 11/2003 | Chen et al. | 442/327 |
| 2007/0221563 | A1 * | 9/2007 | Sakaino et al. | 210/257.2 |
| 2009/0110907 | A1 | 4/2009 | Jiang et al. | |
| 2011/0036237 | A1 * | 2/2011 | Okada et al. | 95/51 |
| 2013/0287958 | A1 * | 10/2013 | Oouchi | 427/374.1 |
| 2014/0137740 | A1 * | 5/2014 | Aburaya et al. | 96/13 |
| 2015/0086801 | A1 * | 3/2015 | Hiraki et al. | 428/500 |

FOREIGN PATENT DOCUMENTS

| | | | |
|---|---|---|---|
| JP | 7-275672 | A | 10/1995 |
| JP | 7-102310 | B | 11/1995 |
| JP | 2000-229219 | | 8/2000 |
| JP | 2009-195900 | A | 9/2009 |
| WO | 9703118 | A | 1/1997 |
| WO | 2009/058206 | A2 | 5/2009 |

OTHER PUBLICATIONS

Machine Translation of Jp 07275672 A Oct. 24, 1995 Nakabayashi et al.*

Min-Joung Kim et al: "Gas permeation through water-swollen polysaccharide/poly(vinyl alcohol) membranes", Journal of Applied Polymer Science, vol. 91, No. 5, Mar. 5, 2004, pp. 3225-3232, XP055117268.

El-Azzami L A et al: "Carbon dioxide separation from hydrogen and nitrogen by fixed facilitated transport in swollen chitosan membranes", Journal of Membrane Science, Elsevier Scientific Publ. Company. Amsterdam, NL, vol. 323, No. 2, Oct. 15, 2008, pp. 225-234, XP025677273.

Extended European Search Report dated May 30, 2014 from the EPO in an European patent application corresponding to the instant patent application, 6 pages.

Japanese Office Action dated Nov. 25, 2014, issued in corresponding Japanese Patent Application, including the translation 7 pages.

Written Opinion of the ISA issued in International Application No. PCT/JP2011/076565 mailed on Jan. 31, 2012.

International Search Report issued in International Application No. PCT/JP2011/076565 mailed on Jan. 31, 2012.

English language translation of the following: Office action dated Sep. 28, 2014 from the SIPO in a Chinese patent application corresponding to the instant patent application. This office action translation is submitted now in order to supplement the understanding of the cited reference which is being disclosed in the instant Information Disclosure Statement, 18 pgs with translation.

Chinese Office action dated Apr. 9, 2015 from the SIPO in a Chinese patent application corresponding to the instant patent application with the Partial English Translation, 11 pgs with translation.

English language translation of the following: Office action dated Jul. 28, 2015 from the JPO in a Japanese patent application corresponding to the instant patent application.

* cited by examiner

COMPOSITION FOR FORMATION OF CARBON DIOXIDE SEPARATION MEMBRANE, CARBON DIOXIDE SEPARATION MEMBRANE AND PROCESS FOR PRODUCTION THEREOF, AND CARBON DIOXIDE SEPARATION APPARATUS

CROSS-REFERENCE TO RELATED APPLICATIONS

This application is a continuation application of International Application No. PCT/JP/2011/076565, filed Nov. 17, 2011, the disclosure of which is incorporated herein by reference in its entirety. Further, this application claims priority from Japanese Patent Application No. 2011-004274, filed Jan. 12, 2011, Japanese Patent Application No. 2011-068245, filed Mar. 25, 2011, and Japanese Patent Application No. 2011-167488, filed Jul. 29, 2011, the disclosures of which are incorporated by reference herein in their entirety. Further, the disclosures of Japanese Patent Application No. 2011-250968 is incorporated by reference herein in its entirety.

TECHNICAL FIELD

The present invention relates to a composition for forming a carbon dioxide separation membrane, a carbon dioxide separation membrane and a process for producing the same, and a carbon dioxide separation apparatus.

BACKGROUND ART

Recently, development of techniques for selectively separating carbon dioxide in a mixed gas is advancing. For example, as a countermeasure for global warming, a technique of collecting carbon dioxide in exhausted gas and condensing it, and a technique of reforming hydrocarbon into hydrogen and carbon monoxide (CO) by means of steam reforming, further allowing the carbon monoxide to react with steam to form carbon dioxide and hydrogen, and excluding the carbon dioxide by using a membrane which is selectively permeable to carbon dioxide, thereby obtaining gas for fuel cells or the like which includes hydrogen as a main component, have been developed.

Meanwhile, regarding separation of carbon dioxide, an amine absorption method, in which adsorption and desorption are repeated by amines, is a general method and has been widely used. However, this method is disadvantageous in that a huge installation area is needed for the facilities and, in addition, it is necessary to repeat increasing pressure/decreasing pressure and lowering temperature/elevating temperature at the time of adsorption/desorption, which needs a large amount of energy. Further, the capacity of the system has been determined at the time of planning, and thus, it is not easy to increase or decrease the capacity of the system once formed. In contrast, a membrane separation method is a method of performing separation naturally by utilizing the component pressure of carbon dioxide in the two regions separated by a separation membrane and is advantageous in that consumption of energy is low and the installation area is small. Further, increase or decrease in the capacity of the system can be conducted by increasing or decreasing the number of filter units and therefore, it is possible to provide a system having excellent scalability; accordingly, the membrane separation method has recently attracted attention.

Carbon dioxide separation membranes can be roughly classified into so-called accelerated transport membranes, in which a carbon dioxide carrier is included in the membrane and carbon dioxide is transported to the opposite side of the membrane by this carrier, and dissolution diffusion membranes, with which separation is performed by utilizing the difference in solubility with respect to the membrane and the difference in diffusivity in the membrane, between carbon dioxide and the substance to be subject to separation. Since a dissolution diffusion membrane is used to perform separation based on the solubilities of carbon dioxide and the substance to be subject to separation with respect to the membrane and the diffusion speeds, the degree of separation is determined unequivocally when the material and physical properties of the membrane are determined, and further, since the permeation speed increases as the thickness of the membrane gets thinner, the dissolution diffusion membrane is generally produced as a thin membrane having a thickness of 1 μm or less, by using a layer separation method, a surface polymerization method, or the like.

In contrast, in an accelerated transport membrane, by the addition of a carbon dioxide carrier into the membrane, the solubility of carbon dioxide is drastically increased, and transportation is carried out under a high concentration environment. Accordingly, the accelerated transport membrane is characterized in that, in general, the separation degree with respect to the substance to be separated is generally higher, and the permeation speed of carbon dioxide is higher, as compared with a dissolution diffusion membrane. Further, since the concentration of carbon dioxide in the membrane is high, the diffusion of carbon dioxide in the membrane rarely becomes a rate-limiting factor, and in the sense of increasing the degree of separation with respect to the substance to be separated, it is more preferable that the accelerated transport membrane is a thick membrane having a thickness of 10 μm or more.

For example, in Japanese Patent Application Publication (JP-B) No. 7-102310, a technique for producing a carbon dioxide separation gel membrane, the technique including coating an aqueous solution of an uncrosslinked vinyl alcohol-acrylate copolymer on a carbon dioxide permeable support to form a membrane, then heating and crosslinking the membrane to become water insoluble, and then allowing the water insoluble substance to absorb an aqueous solution containing a carbon dioxide carrier (a substance that has affinity with carbon dioxide) to gelate the membrane, has been proposed.

Further, in Japanese Patent Application Laid-Open (JP-A) No. 2009-195900, a carbon dioxide separation apparatus, in which a gel layer obtained by adding an additive including cesium carbonate or cesium hydrogencarbonate or cesium hydroxide to a polyvinyl alcohol-polyacrylic acid copolymer gel membrane is provided on a hydrophilic porous membrane to form a $CO_2$ accelerated transport membrane, and a source gas including at least carbon dioxide and steam as well as a certain main component of gas is supplied to the surface of the source side of the $CO_2$ accelerated transport membrane at a supply temperature of 100° C. or higher, and then the carbon dioxide, that has been permeated through the $CO_2$ accelerated transport membrane, is taken out from the surface of the permeation side, has been proposed.

SUMMARY OF INVENTION

Technical Problem

Membranes such as those shown in the above-described JP-B No. 7-102310 and JP-A No. 2009-195900 should have a film thickness after coating and drying of 10 μm or more, and therefore, the thickness of the coated film in the state of a solution containing a solvent may become from 20 µm to 3000 µm. It has been found that, not only does such a coated film having a great thickness require a long time to be dried, but various problems such as deviation in the coated film during drying (nonuniformity in film thickness), dripping, cissing, splashing of the membrane, orange peel, phase separation, or the like. may occur In particular, in the case of performing successive coating, it is impossible to perform drying while holding the support in a horizontal direction by arranging a linear drying zone for drying, since it takes a long time to carry out drying, and thus, it is necessary to carry out drying while meandering the support or by a reel system; however, with such a form of drying, the above-described problems become especially significant, so that it becomes almost impossible to perform successive coating.

The present inventors have exerted intensive effort to address this problem and, as a result, have found that the various problems described above can be addressed by thickening the coating liquid after coating to reduce fluidity, and have made investigations for various gelation methods, whereby the present invention was achieved.

Namely, an object of the invention is to provide a composition for forming a carbon dioxide separation membrane, with which a carbon dioxide separation membrane having excellent gas separation characteristics can be produced with high productivity and low cost; a carbon dioxide separation membrane having excellent gas separation characteristics and a process for producing the same; and a carbon dioxide separation apparatus.

Solution to Problem

In order to achieve the above object, the following invention is provided.

<1> A composition for forming a carbon dioxide separation membrane, the composition including a water-absorbing polymer, a carbon dioxide carrier, and a polysaccharide.

<2> A composition for forming a carbon dioxide separation membrane, the composition including a water-absorbing polymer, a carbon dioxide carrier, and a polysaccharide, wherein a viscosity of the composition, when measured in accordance with JIS Z8803 using a B type viscometer while cooling the surroundings of a container having the composition contained therein with 0° C. ice water, reaches 1000 cp or higher within 700 seconds, after the initiation of cooling.

As the container having the composition contained therein, a container made of stainless-steel is used.

<3> The composition for forming a carbon dioxide separation membrane according to <1> or <2>, wherein the polysaccharide is agar.

<4> The composition for forming a carbon dioxide separation membrane according to any of <1> to <3>, wherein a content of the polysaccharide is 10% by mass or less, with respect to the composition.

<5> The composition for forming a carbon dioxide separation membrane according to any of <1> to <4>, wherein a content of the polysaccharide is from 0.3% by mass to 5% by mass, with respect to the composition.

<6> The composition for forming a carbon dioxide separation membrane according to any of <1> to <5>, wherein the water-absorbing polymer is a polyvinyl alcohol-polyacrylic acid copolymer.

<7> The composition for forming a carbon dioxide separation membrane according to any of <1> to <6>, wherein the carbon dioxide carrier is an alkali metal carbonate.

<8> The composition for forming a carbon dioxide separation membrane according to any of <1> to <7>, wherein the carbon dioxide carrier is a compound containing at least one selected from the group consisting of cesium, rubidium, and potassium.

<9> The composition for forming a carbon dioxide separation membrane according to any of <1> to <8>, further including an amino acid.

<10> The composition for forming a carbon dioxide separation membrane according to <9>, wherein the amino acid has a Log P value of −2.5 or less.

<11> The composition for forming a carbon dioxide separation membrane according to <9> or <10>, wherein the amino acid is at least one selected from the group consisting of glycine and serine.

<12> A process for producing a carbon dioxide separation membrane, the process including:

a composition preparing step of preparing a composition for forming a carbon dioxide separation membrane, which contains a water-absorbing polymer, a carbon dioxide carrier, and a polysaccharide;

a coating step of coating the composition on a support;

a cooling step of cooling the coated film obtained in the coating step to obtain a gel membrane;

a drying step of drying the gel membrane to obtain a dried membrane; and a crosslinking step of crosslinking the dried membrane to obtain a carbon dioxide separation membrane.

<13> The process for producing a carbon dioxide separation membrane according to <12>, wherein the composition for forming a carbon dioxide separation membrane according to any of <1> to <11> is used as the composition for forming a carbon dioxide separation membrane.

<14> The process for producing a carbon dioxide separation membrane according to <12> or <13>, wherein an area of the support is 30 $cm^2$ or more.

<15> The process for producing a carbon dioxide separation membrane according to any of <12> to <14>, wherein the support is belt-shaped and sent off from a let-off roll, and while conveying the support, the coating step, the cooling step, and the drying step are performed in order and then, before or after the crosslinking step, the dried membrane or the carbon dioxide separation membrane is wound up onto a take-up roll.

<16> The process for producing a carbon dioxide separation membrane according to <15>, wherein the support is conveyed at a conveying speed of 1 m/min or higher from the coating step to the drying step.

<17> The process for producing a carbon dioxide separation membrane according to any of <12> to <16>, wherein the gel membrane is formed to have a thickness of 10 µm or more.

<18> The process for producing a carbon dioxide separation membrane according to any of <12> to <17>, wherein the cooling step is performed at a wet bulb temperature of 35° C. or lower.

<19> A carbon dioxide separation membrane including a water-absorbing polymer, a carbon dioxide carrier, and a polysaccharide.

<20> The carbon dioxide separation membrane according to <19>, wherein the carbon dioxide carrier includes a compound containing at least one selected from the group consisting of cesium, rubidium, and potassium.

<21> The carbon dioxide separation membrane according to <19> or <20>, further including an amino acid.

<22> The carbon dioxide separation membrane according to <21>, wherein the amino acid is at least one selected from the group consisting of glycine and serine.

<23> The carbon dioxide separation membrane according to any of <20> to <22>, wherein a compound containing cesium is included, as the carbon dioxide carrier, in an amount of 50% by mass or more with respect to the carbon dioxide separation membrane.

<24> The carbon dioxide separation membrane according to any of <20> to <22>, wherein a compound containing potassium is included, as the carbon dioxide carrier, in an amount of 15% by mass or more with respect to the carbon dioxide separation membrane.

<25> A carbon dioxide separation apparatus equipped with the carbon dioxide separation membrane according to any of <19> to <24>.

Advantageous Effects of Invention

According to the present invention, a composition for forming a carbon dioxide separation membrane, with which a carbon dioxide separation membrane having excellent gas separation characteristics can be produced with high productivity, a carbon dioxide separation membrane having excellent gas separation characteristics and a process for producing the same, and a carbon dioxide separation apparatus are provided.

DESCRIPTION OF EMBODIMENTS

Figure 1:
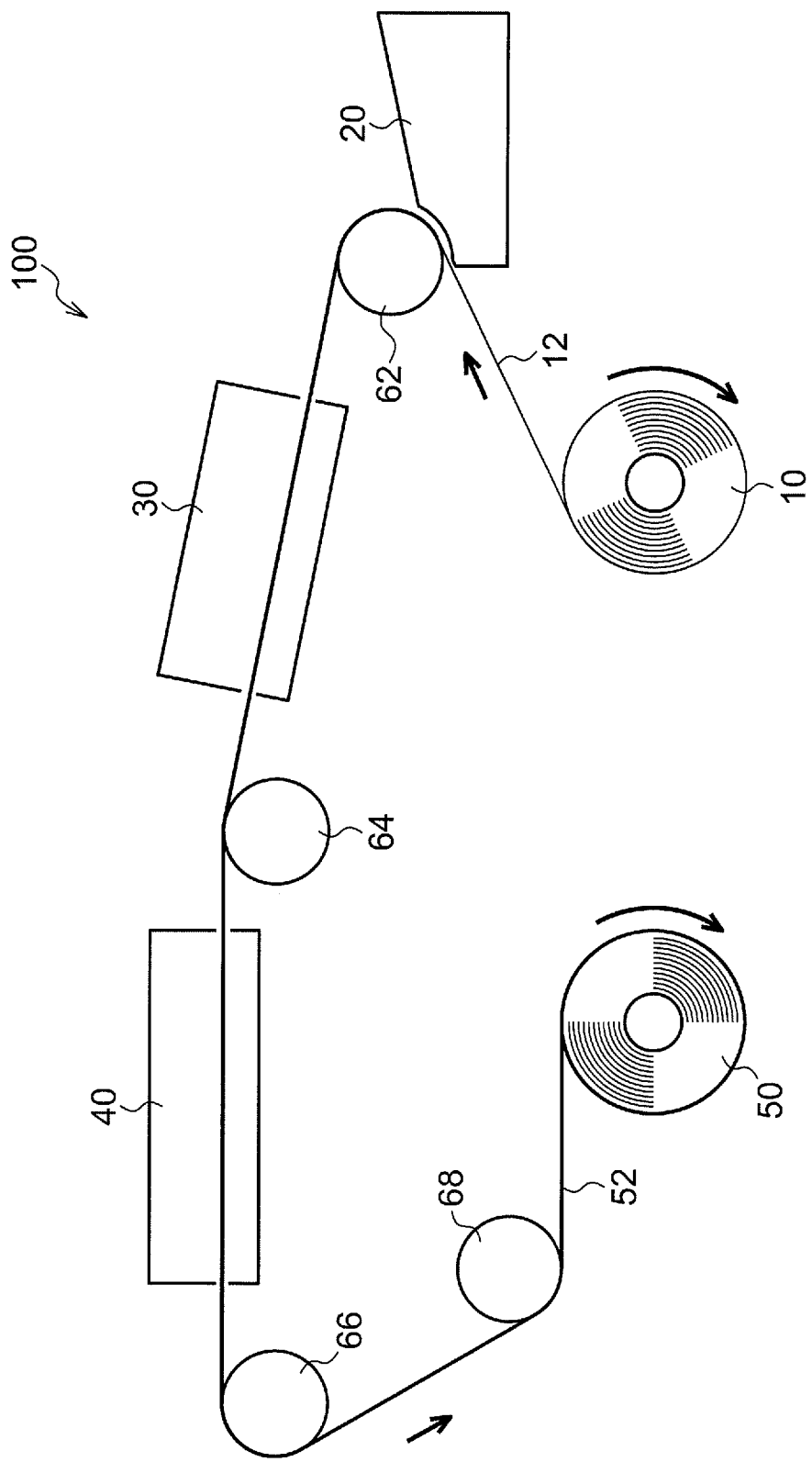
FIG. 1 is a conceptual diagram showing a constitutional example of an apparatus used in the process for producing a carbon dioxide separation membrane according to the present invention.

Hereinafter, the present invention is specifically explained with reference to the attached drawings.

Regarding compositions for forming a carbon dioxide separation membrane, coating has been performed in a laboratory level, but coating on a support having a relatively large area has not been performed, and specifically, studies on "Roll-to-Roll" (which may be abbreviated to "R to R") has not been conducted. The present inventors thought that a roll-to-roll method using a belt-shaped support (a web such as a substrate film or the like) is suitable, in order to produce a carbon dioxide separation membrane with high efficiency (high speed and low cost). In the case of producing a carbon dioxide separation membrane by means of roll-to-roll coating, for the purpose of ensuring the separation characteristics of the membrane, the film thickness should be at minimum 10 μm, and in the case of coating this solid in the state of being dissolved in a solvent, the thickness of the coated film immediately after the coating (undried) is from 20 μm to 3000 μm. It was found that when such a thick membrane is coated and dried using a generally used coating liquid composition, cissing or splashing of coated film, variation in film thickness, dripping, or the like occurs in the drying step, and due to the variation in film thickness, variation in separation and permeation performance occurs, and thus, the performance as an industrial product cannot be ensured. The present inventors have found, after studying hard the problems, that by increasing the viscosity of the solution immediately after coating to reduce the fluidity, cissing and splashing of coated film, dripping, and nonuniformity in film thickness are suppressed, and a separation membrane having less defects and high uniformity can be obtained, whereby the present invention has been completed. Namely, by cooling the coated film immediately after coating, gelation is caused (in the present invention, the term "gelation" means realizing high viscosity, and does not necessarily represent the state in which fluidity is lost at all) and, by carrying out general drying thereafter, a good separation membrane can be produced.

Therefore, the present inventors have studied a lot about a method for imparting gelation property with which salting-out does not occur in a composition, and which enables gelation immediately after coating the composition on a support and is capable of enduring the velocity of dry air. As a result, the present inventors have found that, when a coated film is formed by coating, on a support, a composition in which a polysaccharide is added as a gelation agent, in addition to a water-absorbing polymer and a carbon dioxide carrier, the coated film can be gelated immediately after coating, and even if air for drying is applied thereto, the gel membrane before drying is not splashed, and a carbon dioxide separation membrane having excellent film thickness uniformity and excellent gas separation characteristics can be obtained. Accordingly, by using a composition as described above, a carbon dioxide separation membrane having excellent gas separation characteristics can be produced with high productivity by means of Roll-to-Roll.

<Process for Producing Carbon Dioxide Separation Membrane>

The process for producing a carbon dioxide separation membrane according to the present invention includes a composition preparing step of preparing a composition for forming a carbon dioxide separation membrane (hereinafter, may be simply referred to as "composition" or "coating liquid"), which contains a water-absorbing polymer, a carbon dioxide carrier, and a polysaccharide; a coating step of coating the composition on a support; a cooling step of cooling the coated film obtained in the coating step to obtain a gel membrane; a drying step of drying the gel membrane to obtain a dried membrane; and a crosslinking step of crosslinking the dried membrane to obtain a carbon dioxide separation membrane.

FIG. 1 schematically shows one example of the configuration of an apparatus used in the process for forming a carbon dioxide separation membrane according to the present invention. This apparatus 100 is equipped with a let-off roll 10 that sends off the belt-shaped support 12, a coater 20 with which the composition is coated on the support 12, a cooling section 30 where the composition that has been coated is gelated, a drying section 40 where the gel membrane is dried, and a take-up roll 50 that winds up the obtained carbon dioxide separation membrane 52 in a roll form. Further, conveying rolls 62, 64, 66, and 68 for conveying the support 12 to each of the sections 20, 30, 40, and 50 are arranged.

By the use of the apparatus 100 having a configuration as described above, roll-to-roll can be carried out, that is, the support 12 can be sent off from the let-off roll 10, and while conveying the support 12, the coating step, the cooling step, and the drying step can be carried out in order, and then the obtained carbon dioxide separation membrane 52 can be wound up onto the take-up roll 50, and further, by carrying out a crosslinking step, a carbon dioxide separation membrane 52 having excellent gas separation characteristics can be produced successively and efficiently. Note that, the crosslinking step may be carried out before winding up the membrane obtained after the drying step onto the take-up roll 50 or may be carried out after winding up into a roll.

Figure 2:
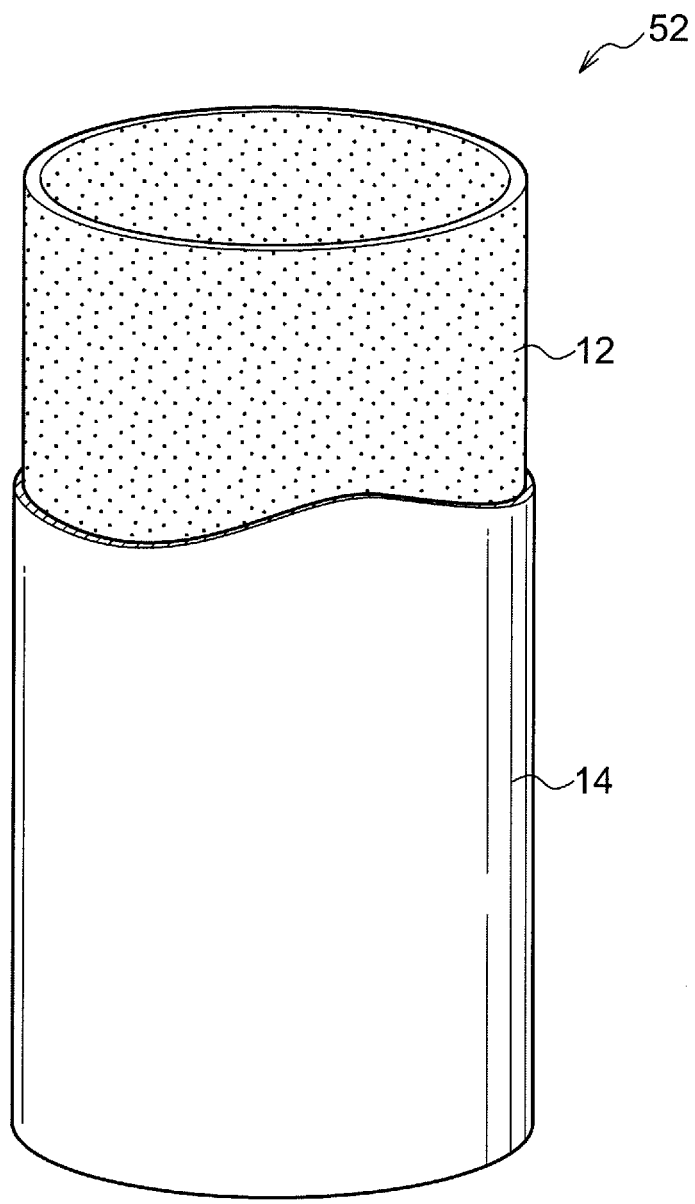
FIG. 2 is a conceptual diagram showing a constitutional example of a composite for forming a carbon dioxide separation membrane, which has a carbon dioxide separation membrane according to the present invention.

FIG. 2 schematically shows one example of the configuration of a composite for separation of carbon dioxide, which is equipped with a support 12 and a carbon dioxide separation membrane 14 produced by using the composition for forming a carbon dioxide separation membrane of the invention. In this composite 52 for separation of carbon dioxide, the carbon dioxide separation membrane 14 is formed on the outer peripheral surface of the cylindrical support 12 which is permeable to carbon dioxide. In a device equipped with the carbon dioxide separation membrane 14 as described above, by supplying a mixed gas including carbon dioxide to the inner side or the outer side of the composite 52, along with providing a difference in pressure between the inside and the outside such that the pressure at the mixed gas supplying side becomes lower than the pressure at the permeation side, the carbon dioxide in the mixed gas passes through the support 12 and the carbon dioxide separation membrane 14, whereby gas separation can be conducted.

In the following, the composition for forming a carbon dioxide separation membrane according to the present invention and a process for producing a carbon dioxide separation membrane are specifically described.

—Composition Preparing Step—

First, a composition for forming a carbon dioxide separation membrane, which contains a water-absorbing polymer, a carbon dioxide carrier, and a polysaccharide, is prepared. In the step of preparing a composition for forming a carbon dioxide separation membrane according to the present invention, a water-absorbing polymer, a carbon dioxide carrier, and a polysaccharide that imparts a good setting property (gelation property) are added to water, each in an appropriate amount.

(Water-Absorbing Polymer)

The water-absorbing polymer contained in the composition of the present invention is a polymer that functions as a binder, and when used in a carbon dioxide separation membrane, the water-absorbing polymer retains moisture and allows the function of separation of carbon dioxide by a carbon dioxide carrier to be exhibited. From the viewpoint of having solubility in water to be able to form a coating liquid and providing a carbon dioxide separation membrane that has a high water absorbing property (moisture retaining property), the water-absorbing polymer is preferably a polymer having a high water absorbing property, and it is preferable to have a water absorbing property such that the amount of physiological saline absorbed is 0.5 g/g or more, it is more preferable to have a water absorbing property such that the amount of physiological saline absorbed is 1 g/g or more, it is even more preferable to have a water absorbing property such that the amount of physiological saline absorbed is 5 g/g or more, it is particularly preferable to have a water absorbing property of 10 g/g or more, and it is most preferable to have a water absorbing property such that the amount of physiological saline absorbed is 20 g/g or more.

As the water-absorbing polymer contained in the composition of the present invention, conventionally known hydrophilic polymers can be used, but from the viewpoints of water absorbing property, film forming property, strength, and the like, for example, polyvinyl alcohols, polyacrylic acids, polyethylene oxides, water-soluble celluloses, starches, alginic acids, chitins, polysulfonic acids, polyhydroxy methacrylates, polyvinyl pyrrolidones, poly-N-vinyl acetamides, polyacrylamides, polyethyleneimines, polyallylamines, polyvinylamines, and the like are preferable. Copolymers of these compounds may also be used preferably.

Particularly, polyvinyl alcohol-polyacrylic acid salt copolymers are preferable. Polyvinyl alcohol-polyacrylic acid salt copolymers have high water absorbing ability, and in addition, even at the time of high water absorption, the strength of hydrogel is great. The content ratio of polyacrylic acid salt in the polyvinyl alcohol-polyacrylic acid salt copolymer is, for example, from 1 mol % to 95 mol %, preferably from 2 mol % to 70 mol %, more preferably from 3 mol % to 60 mol %, and particularly preferably from 5 mol % to 50 mol %. Examples of the polyacrylic acid salt include an alkali metal salt such as a sodium salt or a potassium salt, an ammonium salt, an organic ammonium salt, and the like.

Examples of a commercially available polyvinyl alcohol-polyacrylic acid salt copolymer (sodium salt) include SUMIKAGEL L-5H (manufactured by Sumitomo Chemical Co., Ltd.) and KURASTMER AP20 (manufactured by Kuraray Co., Ltd.).

The water-absorbing polymers may be used as a mixture of two or more types of them.

Although it depends on the kind, the content of the water-absorbing polymer in the composition (coating liquid) is preferably from 0.5% by mass to 50% by mass, more preferably from 1% by mass to 30% by mass, and particularly preferably from 2% by mass to 15% by mass, from the viewpoint of being used as a binder to form a membrane and providing a carbon dioxide separation membrane that can sufficiently retain moisture.

(Carbon Dioxide Carrier)

The carbon dioxide carrier contained in the composition of the present invention may be any substance that has affinity with carbon dioxide and exhibits water solubility, and known substances can be used. The carbon dioxide carrier in this case is a substance having affinity with carbon dioxide, and various kinds of water-soluble inorganic or organic substances that exhibit basic properties are used. Examples thereof include an alkali metal carbonate and/or an alkali metal hydrogencarbonate and/or an alkali metal hydroxide; an aqueous solution obtained by adding a multidentate ligand that forms a complex with an alkali metal ion to an aqueous solution containing an alkali metal carbonate and/or an alkali metal hydrogencarbonate and/or an alkali metal hydroxide; ammonia; ammonium salts; various kinds of straight-chain or cyclic amines; amine salts; and ammonium salts. Further, water-soluble derivatives of these compounds can also be used preferably.

Since a carrier that can be retained in the separation membrane for a long period of time is useful, an amine-containing compound which hardly evaporates, such as an amino acid, a betaine, or the like, is particularly preferable.

Examples of the alkali metal carbonate include lithium carbonate, sodium carbonate, potassium carbonate, rubidium carbonate, and cesium carbonate.

Examples of the alkali metal hydrogencarbonate include lithium hydrogencarbonate, sodium hydrogencarbonate, potassium hydrogencarbonate, rubidium hydrogencarbonate, and cesium hydrogencarbonate.

Examples of the alkali metal hydroxide include lithium hydroxide, sodium hydroxide, potassium hydroxide, cesium hydroxide, and rubidium hydroxide.

Among them, alkali metal carbonates are preferable, and compounds which have high solubility and contain cesium, rubidium, or potassium are preferable.

Examples of an alkanolamine may include various water-soluble alkanolamines such as monoethanolamine, diethanolamine, triethanolamine, monopropanolamine, dipropanolamine, or tripropanolamine. The carbon dioxide carrier is not limited to those described above, and may be any substance that has affinity with carbon dioxide and exhibits water solubility; and various compounds such as an alkali metal salt of an organic acid or the like can be used.

As the multidentate ligand that forms a complex with an alkali metal ion, a conventionally known multidentate ligand, for example: a cyclic polyether such as 12-crown-4,15-crown-5,18-crown-6, benzo-12-crown-4, benzo-15-crown-5, benzo-18-crown-6, dibenzo-12-crown-4, dibenzo-15-crown-5, dibenzo-18-crown-6, dicyclohexyl-12-crown-4, dicyclohexyl-15-crown-5, dicyclohexyl-18-crown-6, n-octyl-12-crown-4, n-octyl-15-crown-5, or n-octyl-18-crown-6; a cyclic polyether amine such as cryptand[2.1] or cryptand [2.2]; a bicyclic polyether amine such as cryptand[2.2.1] or cryptand[2.2.2]; porphyrin, phthalocyanine, polyethylene glycol, ethylenediamine tetraacetate, or the like, can be used.

As the amino acid, glycine, alanine, serine, proline, histidine, cysteine, taurine, diaminopropionic acid, phosphoserine, sarcosine, dimethylglycine, β-alanine, 2-aminoisobutyric acid, or the like can be used, regardless of the presence or absence in nature, and a peptide, in which several amino acids are linked together, may also be used. Note that, in the case of a hydrophobic amino acid, the amino acid causes phase separation with a hydrophilic gel membrane, and thus the permeability of gas other than carbon dioxide is also raised; however, since hydrophilic amino acids have high solubility and high affinity with water-absorbing polymers and polysaccharides, a hydrophilic amino acid is particularly preferable. Specifically, the Log P value (P: partition coefficient to an octanol-water system), which is a character indicating the hydrophilicity and hydrophobicity of an amino acid, is preferably −1.5 or less, more preferably −2.0 or less, and particularly preferably −2.5 or less. Examples of an amino acid having a Log P value of −2.5 or less include arginine, lycine, aspartic acid, glutamic acid, glutamine, histidine, proline, serine, threonine, glycine, alanine, diaminopropionic acid, and taurine.

The Log P value of an amino acid can be estimated by a computational chemical method or an empirical method. Concerning the calculation method, there are a Crippen's fragmentation method (J. Chem. Inf. Comput. Sci., 27, 21 (1987).), a Viswanadhan's fragmentation method (J. Chem. Inf. Comput. Sci., 29, 163 (1989).), a Broto's fragmentation method (Eur. J. Med. Chem.-Chim. Theor., 19, 71 (1984).), and the like; however, in the present invention, in a case in which the value of log P of a compound differs according to the measurement method or the calculation method, the value is judged by the Crippen's fragmentation method.

Specifically, the amino acid is preferably arginine, lycine, aspartic acid, glutamic acid, glutamine, histidine, proline, serine, threonine, glycine, alanine, diaminopropionic acid, or taurine; more preferably glycine, serine, alanine, diaminopropionic acid, or taurine; and particularly preferably glycine or serine.

Regarding the addition amount of the amino acid, a greater amount is preferable, since the permeation speed of carbon dioxide is raised, but when the addition amount is too large, the gel membrane becomes brittle, and the permeability of gas other than carbon dioxide is also raised, and from this point of view, the addition amount of the amino acid is preferably from 3% by mass to 90% by mass, more preferably from 5% by mass to 60% by mass, and particularly preferably from 10% by mass to 50% by mass, with respect to the gel membrane.

The carbon dioxide carriers may be used as a mixture of two ore more types of them.

Particularly, it is preferable to use an alkali metal carbonate and an amino acid in combination, from the viewpoint of enhancing the carbon dioxide permeation speed and the separation factor. In particular, it is preferable to add a hydrophilic amino acid to one or more of cesium carbonate, rubidium carbonate, or potassium carbonate, and particularly, it is preferable to use glycine and/or serine. It is thought that, by adding an amino acid, in addition to an alkali metal carbonate, as a carbon dioxide carrier, a path for absorption and desorption of carbon dioxide is also formed by the amino acid, and thus permeation of carbon dioxide is accelerated.

Preferable examples of the betaine as a carbon dioxide carrier include carnitine and trimethylglycine, and trimethylglycine is particularly preferable.

Although it depends on the kind, the content of the carbon dioxide carrier in the composition (coating liquid) is preferably from 0.3% by mass to 30% by mass, more preferably from 0.5% by mass to 25% by mass, and particularly preferably from 1% by mass to 20% by mass, in order to prevent salting-out before coating and to reliably exhibit the function of separation of carbon dioxide.

(Polysaccharide)

As the polysaccharide contained in the composition of the present invention, a polysaccharide is used, with which a gel membrane (set membrane) having a high film thickness uniformity can be formed by coating, on a support, a composition in which the polysaccharide is also added in an aqueous solution containing a water-soluble polymer and a carbon dioxide carrier, and cooling the thus formed coated film.

Figure 3:
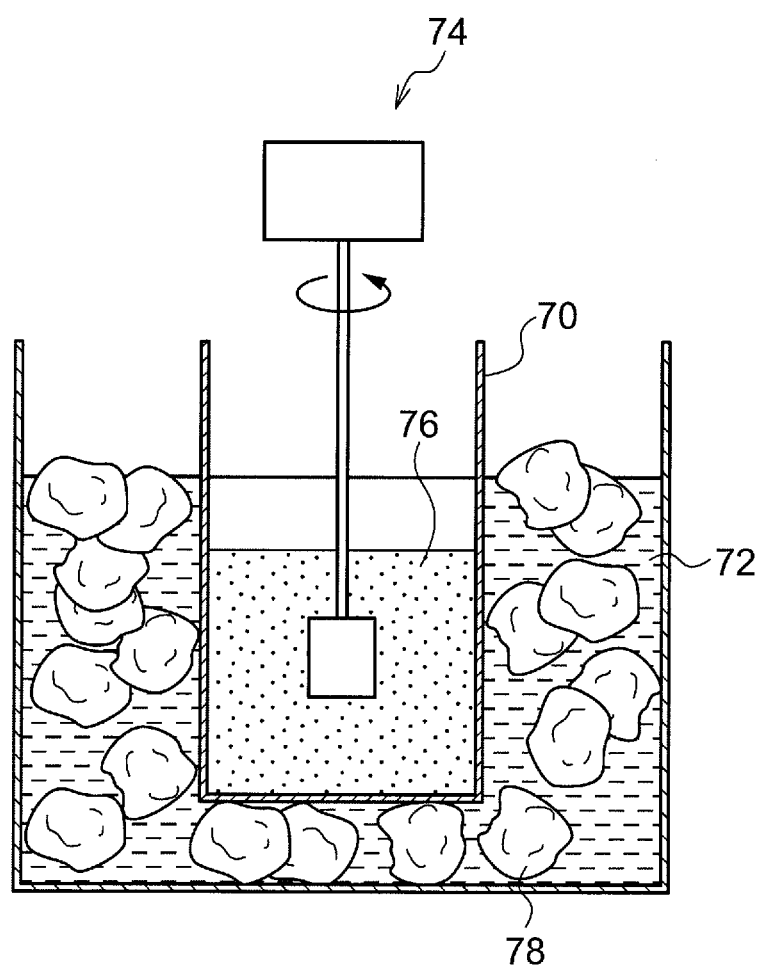
FIG. 3 is a conceptual diagram showing a method for measuring the viscosity of a composition for forming a carbon dioxide separation membrane.

Specifically, a composition (coating liquid) which includes a water-absorbing polymer, a carbon dioxide carrier, a polysaccharide, and water is prepared and, as shown in FIG. 3, the composition is gently poured into a container 70 (inner diameter: 4 cm, height: 12 cm) made of stainless steel, such that the viscometer cylinder (rotor) is sufficiently dipped into the coating liquid. Then, while cooling the surroundings of the container, which has the coating liquid 76 (100 g, starting temperature: 60° C.) contained therein, with 0° C. ice water 72 (a 500 mL disposable cup with an inner diameter of 10 cm and a height of 12 cm is used, and the water level of the ice water stands about 11 cm with respect to the stainless steel cylinder), a B type viscometer 74 (manufactured by Tech-Jam Co., Ltd.; BL2, 1 mPa·s to 100,000 mPa·s/KN3312481) is allowed to work, and the value is read every 30 seconds, thereby measuring the viscosity of the composition (coating liquid) in accordance with JIS Z8803. In this process, it is preferable to contain a polysaccharide, with which the viscosity of the composition (coating liquid) reaches 1000 cp or higher within 2000 seconds, after the initiation of cooling, and further, it is more preferable that the viscosity of the composition (coating liquid) reaches 1000 cp or higher within 1000 seconds, after the initiation of cooling, and it is most preferable that the viscosity of the composition (coating liquid) reaches 1000 cp or higher within 700 seconds, after the initiation of cooling. It should be noted that 78 in FIG. 3 represents an ice.

However, when the viscosity of the prepared coating liquid becomes higher than necessary, coating may become difficult and thus, the film thickness uniformity may be deteriorated. Accordingly, when the viscosity of the coating liquid is measured by the above method, the viscosity immediately after the initiation of cooling is preferably 300 cp or lower, more preferably 200 cp or lower, and most preferably 150 cp or lower.

As such a polysaccharide, a starch, a cellulose, agarose, xanthan gum, guar gum, glucomannan, curdlan, carrageenan, xanthan gum, gellan gum, dextran, locust bean gum, an alginic acid, a hyaluronic acid, or the like can be used; however, from the viewpoints of film forming property, availability, cost, membrane strength, and the like, agar is preferable, and examples of a commercially available product include INA AGAR UP-37, UM-11S, SY-8, ZY-4, and ZY-6 (all manufactured by Ina Food Industry Co., Ltd.), AGAROSE H and AGAROSE S (all manufactured by NIPPON GENE CO., LTD.), and the like. The polysaccharides may be used alone or may be used as a mixture of two or more of them. Among these polysaccharides, those having a function of increasing the gelation ability by mixing are known, and such compounds may be used by mixing, in order to adjust the gelation speed, the gelation ability, or the gelation temperature.

Further, the gelation agent used in the present invention may also serve as a water-absorbing polymer. In this case, the amount used is determined according to the amount used and content ratio of the water-absorbing polymer.

Regarding the content of the polysaccharide in the composition (coating liquid), although it depends on the type, when the content of the polysaccharide is too large, there are cases in which the viscosity of the coating liquid becomes high in a short time such that coating becomes difficult, and there is a possibility that coating defects may occur. Further, from the viewpoint of suppressing the lowering of uniformity in film thickness, the content of the polysaccharide in the composition is preferably 10% by mass or less, more preferably from 0.1% by mass to 8% by mass, and most preferably from 0.3% by mass to 5% by mass.

(Crosslinking Agent)

Crosslinking of the water-absorbing polymer can be carried out by a conventionally known technique such as heat crosslinking, ultraviolet ray crosslinking, electron-beam crosslinking, radiation crosslinking, or the like. It is preferable that the composition of the present invention includes a crosslinking agent. Particularly, it is preferable to include a crosslinking agent having two or more functional groups capable of performing heat crosslinking by reacting with a polyvinyl alcohol-polyacrylic acid salt copolymer, and examples include a polyvalent glycidyl ether, a polyhydric alcohol, a polyvalent isocyanate, a polyvalent aziridine, a haloepoxy compound, a polyvalent aldehyde, and a polyvalent amine.

Here, examples of the polyvalent glycidyl ether include ethylene glycol diglycidyl ether, polyethylene glycol diglycidyl ether, glycerol polyglycidyl ether, diglycerol polyglycidyl ether, polyglycerol polyglycidyl ether, sorbitol polyglycidyl ether, pentaerythritol polyglycidyl ether, propylene glycol glycidyl ether, and polypropylene glycol diglycidyl ether.

Examples of the polyhydric alcohol include ethylene glycol, diethylene glycol, triethylene glycol, tetraethylene glycol, polyethylene glycol, glycerin, polyglycerin, propylene glycol, diethanolamine, triethanolamine, polyoxypropyl, oxyethylene oxypropylene block copolymer, pentaerythritol, and sorbitol.

Examples of the polyvalent isocyanate include 2,4-toluoylene diisocyanate and hexamethylene diisocyanate. Further, examples of the polyvalent aziridine include 2,2-bishydroxymethylbutanol-tris[3-(1-aziridinyl)propionate], 1,6-hexamethylenediethylene urea, and diphenylmethane-bis-4,4'-N,N'-diethylene urea.

Examples of the haloepoxy compound include epichlorohydrin and α-methylepichlorohydrin.

Further, examples of the polyvalent aldehyde include glutaraldehyde and glyoxal.

Moreover, examples of the polyvalent amine include ethylenediamine, diethylenetriamine, triethylenetetramine, tetraethylenepentamine, pentaethylenehexamine, and polyethyleneimine.

Among the above crosslinking agents, as a heat crosslinking agent for the polyvinyl alcohol-polyacrylic acid salt copolymer, glutaraldehyde is particularly preferable.

(Additional Component)

The composition of the present invention may include one or more additional components (additives), other than the water-absorbing polymer, the carbon dioxide carrier, or the polysaccharide, to the extent of not exerting any adverse influence on film-forming properties (coating property and setting property) or gas separation characteristics.

Examples of the additional components include, in addition to the crosslinking agent, a surfactant, a catalyst, a moisture-holding (water-absorbing) agent, an auxiliary solvent, a membrane strength adjusting agent, and a defect detecting agent.

Preparation of the composition is conducted by adding the above-described water-absorbing polymer, carbon dioxide carrier, and polysaccharide, and further, as necessary, additional additives, each in an appropriate amount, to water (normal temperature water or heated water), stirring the mixture sufficiently, and, as necessary, heating while stirring to accelerate dissolution. Note that, the water-absorbing polymer, the carbon dioxide carrier, and the polysaccharide may be separately added to water, or a mixture obtained by mixing them in advance may be added to water. For example, a polysaccharide is added to water to dissolve, and then a water-absorbing polymer and a carbon dioxide carrier are gradually added thereto and stirred, whereby deposition (salting-out) of the water-absorbing polymer or the polysaccharide can be effectively prevented.

—Coating Step—

After preparing the composition for forming a carbon dioxide separation membrane, the belt-shaped support 12 is sent off from the let-off roll 10, and is conveyed to the coating section 20, and the above composition (coating liquid) is coated on the support 12 to provide a coated film.

When the temperature of the coating liquid in the coating step lowers, the viscosity may be increased due to the solidification function of the polysaccharide or the water-absorbing polymer may be deposited (salted out), so that coating on a support may become difficult or the variation in film thickness may become more significant. Therefore, after the preparation of the composition of the present invention, it is preferable to keep the temperature until coating, such that gelation or salting out does not occur. The temperature of the composition in the coating step may be determined according to the composition or the concentration, such that gelation or salting-out does not occur; however, when the temperature is too high, there is concern that a large amount of water may evaporate from the composition to change the composition concentration or gelation may partially occur, and thus, the temperature is preferably from about 40° C. to about 95° C., more preferably from 45° C. to 90° C., and most preferably from 50° C. to 85° C.

The support 12 is a substance that supports the carbon dioxide separation membrane 14 and has carbon dioxide permeability, and the support is not particularly limited as long as the carbon dioxide separation membrane 14 can be formed by coating the composition (coating liquid) for forming a carbon dioxide separation membrane according to the invention and the support can support this membrane.

As the material of the support 12, paper, high quality paper, coated paper, cast coated paper, synthetic paper, and further, cellulose, polyester, polyolefin, polyamide, polyimide, polysulfone aramid, polycarbonate, metals, glass, ceramics, and the like can be preferably used. More specifically, resin materials such as polypropylene, polyethylene, polystyrene, polyphenylsulfide, polyether imide, polyether ether ketone, polysulfone, polyether sulfone, polyethylene terephthalate, polytetrafluoroethylene, or polyvinylidene fluoride can be preferably used. Among them, polyolefin and fluorides thereof can be particularly preferably used from the viewpoint of stability over time.

Regarding the form of the support 12, woven fabric, non-woven fabric, porous membrane, or the like can be adopted. In general, a support having a high self-supporting property and a high porosity can be preferably used. A membrane filter of polysulfone or cellulose, a surface polymerization thin membrane of polyamide or polyimide, and an expanded porous membrane of polytetrafluoroethylene or high molecular weight polyethylene have high porosity, exhibit reduced inhibition in carbon dioxide diffusion, and are preferable from the viewpoints of strength, production suitability, and the like. Among them, an expanded membrane of polytetrafluoroethylene (PTFE) is particularly preferable.

These supports may be used alone, but a composite membrane which is integrated with a reinforcing support can also be used preferably.

When the support 12 is too thick, gas permeability lowers, and when the support is too thin, the strength is not sufficient. Therefore, the thickness of the support is preferably from 30 μm to 500 μm, more preferably from 50 μm to 300 μm, and particularly preferably from 50 μm to 200 μm. Further, in the roll-to-roll manufacture, in order to prevent the occurrence of distortion or fracture of the support, for example, it is preferable that the Young's modulus of the support is 0.4 GPa or higher.

Regarding the conveyance speed of the support 12, although it depends on the type of the support 12, the viscosity of the composition (coating liquid), and the like, when the conveyance speed of the support is too high, the film thickness uniformity of the coated film in the coating step may be deteriorated, and when the conveyance speed is too slow, the productivity lowers and, in addition, the viscosity of the composition may increase before the cooling step, so that the uniformity of the film may be deteriorated. The conveyance speed of the support 12 may be determined according to type of the support 12, the viscosity of the composition (coating liquid), or the like, while considering the above points, but is preferably 1 m/min or higher, more preferably from 10 m/min to 200 m/min, and particularly preferably from 20 m/min to 200 m/min.

Regarding the method of coating the composition, a conventionally known method can be employed. Examples include a curtain flow coater, an extrusion die coater, an air doctor coater, a blade coater, a rod coater, a knife coater, a squeeze coater, a reverse roll coater, a bar coater, and the like. Particularly, from the viewpoints of the film thickness uniformity, the coating amount, and the like, an extrusion die coater is preferable.

Regarding the coating amount, although it depends on the constitution of the composition, the concentration, and the like, when the coating amount per unit area is too small, a hole may be formed in the membrane during the cooling step or the drying step, or the strength as a carbon dioxide separation membrane may become insufficient. Meanwhile, when the coating amount is too large, variation in film thickness may become more significant, or the thickness of the carbon dioxide separation membrane obtained may become too large, so that the permeability of carbon dioxide may be deteriorated.

From the viewpoints described above, it is preferable to adjust the coating amount such that the thickness of the gel membrane obtained in the cooling step is 10 μm or more, more preferably 50 μm or more, and particularly preferably 100 μm or more, and the thickness of the carbon dioxide separation membrane obtained in the crosslinking step is 1 μm or more, more preferably 3 μm or more, and particularly preferably 5 μm or more. Further, from the viewpoint of avoiding the lowering of carbon dioxide permeability, it is preferable that the film thickness of the carbon dioxide separation membrane is set to be 1000 μm or less.

(Cooling Step)

The coated film that has been obtained on the support 12 in the coating step is cooled to obtain a gel membrane. The support having a coated film formed thereon is conveyed to the cooling section 30 and is instantly cooled, whereby the coated film is gelated (fixed) due to the solidification function of the polysaccharide, and thus a stable gel membrane (set membrane) is obtained.

When the cooling temperature in the cooling step is too high, it may take a long time for fixing and the film thickness uniformity may be deteriorated, and when the cooling temperature is too low, the gel membrane may freeze and thus, the membrane quality may be changed. In order to obtain a gel membrane in which the thickness of the coated film is almost maintained, the cooling temperature in the cooling step may be determined according to the components of the coated film and the concentration (particularly, the type and concentration of polysaccharide), but from the viewpoint of rapidly gelating the coated film on the support 12 to form a gel membrane, the cooling temperature in the cooling step, in terms of the wet-bulb temperature, is preferably 35° C. or lower, specifically, from 1° C. to 35° C., more preferably from 2° C. to 20° C., and particularly preferably from 5° C. to 15° C.

Further, the passage time in the cooling step is preferably from 1 second to 200 seconds, more preferably from 20 seconds to 150 seconds, and particularly preferably from 30 seconds to 100 seconds, from the viewpoints of improvement in productivity and the like.

As described above, after providing a coated film by coating the composition of the present invention on a support, the resulting membrane can be rapidly gelated to be converted into a gel membrane, and therefore, the film thickness can be controlled with high accuracy. Accordingly, a carbon dioxide separation membrane having a large film thickness and having a uniform thickness can be formed, and a carbon dioxide separation membrane having high gas permeation characteristics can be produced with high productivity.

(Drying Step)

After the cooling step, the gel membrane is dried to obtain a dried membrane.

Warm air is applied onto the gel membrane on the support 12 which has been conveyed to the heating section 40, to perform drying. Since the membrane after the cooling step is fixed in a gel state, drying is carried out without causing collapse, even though the air for drying is directed.

The velocity of air is preferably a velocity with which the gel membrane can be rapidly dried and which does not cause collapse of the gel membrane, and is preferably, for example, from 1 m/min to 80 m/min, more preferably from 2 m/min to 70 m/min, and particularly preferably from 3 m/min to 40 m/min.

The temperature of the air is such that the temperature of the membrane surface is preferably from 1° C. to 80° C., more preferably from 2° C. to 70° C., and particularly preferably from 3° C. to 60° C., for the purpose of not causing deformation of the support or the like, and drying the gel membrane rapidly.

(Crosslinking Step)

The crosslinking step and the drying step may be performed simultaneously or may be performed separately. Regarding the crosslinking technique, a known crosslinking technique can be used. For example, crosslinking may be performed by using a heating means such as an infrared heater or the like, after drying the gel membrane by applying warm air thereto; or drying and crosslinking may be performed simultaneously using warm air. Heat crosslinking can be conducted, for example, by heating to the temperature of from about 100° C. to about 150° C. Alternatively, the gel membrane after coating may be subjected to UV or electron beam crosslinking and then dried. Further, a carbon dioxide separation membrane may be obtained by performing crosslinking, after winding up the dried membrane obtained by the drying step onto the take-up roll 50.

By going through the steps described above, a carbon dioxide separation membrane according to the present invention is obtained.

The obtained carbon dioxide separation membrane contains a water-absorbing polymer, a carbon dioxide carrier, and a polysaccharide. The compounding ratio of the coating liquid is reflected in the composition ratio of the components of the carbon dioxide separation membrane.

The content of each component of the carbon dioxide separation membrane in the dried state is preferably within the range described below. Namely, the content of the water-absorbing polymer is preferably from 5% by mass to 90% by mass, more preferably from 10% by mass to 85% by mass, and even more preferably from 15% by mass to 80% by mass. The content of the carbon dioxide carrier is preferably from 5% by mass to 90% by mass, more preferably from 10% by mass to 85% by mass, and even more preferably from 20% by mass to 80% by mass. The content of the polysaccharide is preferably from 1% by mass to 30% by mass, more preferably from 2% by mass to 25% by mass, and even more preferably from 3% by mass to 20% by mass.

For example, in the case of using a compound containing cesium as the carbon dioxide carrier, from the viewpoint of improvement in carbon dioxide separation characteristics, the content of the compound containing cesium in the carbon dioxide separation membrane in the dried state is preferably 50% by mass or higher, more preferably 55% by mass or higher, and particularly preferably 60% by mass or higher. Further, in the case of using, for example, a compound containing potassium as the carbon dioxide carrier, the content of the compound containing potassium in the carbon dioxide separation membrane in the dried state is preferably 10% by mass or higher, is more preferably used at 15% by mass or higher, and is particularly preferably 20% by mass or higher.

Furthermore, in the case of using, as the carbon dioxide carrier, for example, a compound containing cesium or potassium and an amino acid, the content of the amino acid in the carbon dioxide separation membrane in the dried state is preferably 10% by mass or higher, is more preferably used at 15% by mass or higher, and is particularly preferably 20% by mass or higher.

In addition, after preparing the carbon oxide separation membrane 14, a carrier elution prevention layer may be provided on the carbon oxide separation membrane 14, as necessary, in order to prevent elution of carbon dioxide carrier. The carrier elution prevention layer preferably has a nature of permeating gas such as carbon dioxide, steam, or the like but not permeating water or the like, and is preferably a hydrophobic porous membrane.

A membrane having such a nature may be coated on the membrane surface, or a membrane prepared separately may be laminated.

(Carbon Dioxide Separation Apparatus)

In a carbon dioxide separation apparatus, the above carbon dioxide separation membrane may be provided as a flat membrane, or may be utilized by processing into a spiral wound type, a pleated type, or the like, which is known as a reverse osmosis module.

EXAMPLES

Hereinafter, the present invention is specifically described with reference to Examples; however, the invention is by no means limited to the following Examples unless they are beyond the spirit of the invention.

Experiment Example 1

As a polysaccharide, INA AGAR UP-37 (manufactured by Ina Food Industry Co., Ltd.) was added to water, which was stirred, and then the mixture was heated to dissolve the agar sufficiently. To this agar solution, a polyvinyl alcohol-polyacrylic acid copolymer (sodium salt, manufactured by Kuraray Co., Ltd., trade name: KURASTMER AP20), an aqueous solution of cesium carbonate, and glutaraldehyde were added, which was sufficiently stirred while keeping the temperature. Thus, an aqueous solution having an agar concentration of 0.5% by mass, a polyvinyl alcohol-polyacrylic acid salt concentration of 2.5% by mass, a cesium carbonate concentration of 6.0% by mass, and a glutaraldehyde concentration of 0.2% by mass was prepared.

The heat aqueous solution thus prepared was placed in a cylindrical container made of stainless steel, and while cooling the container in ice water from a liquid temperature of 60° C., the viscosity was measured every 30 seconds using a B type viscometer (single cylinder rotational viscometer). The measurement apparatus used and the measurement conditions are shown below.

Measurement apparatus: a B type viscometer (BL2, 1 mPa·s to 100,000 mPa·s/KN3312481)

Measurement conditions: measurement is conducted in accordance with JIS Z8803 while cooling in 0° C. ice water.

Figure 4:
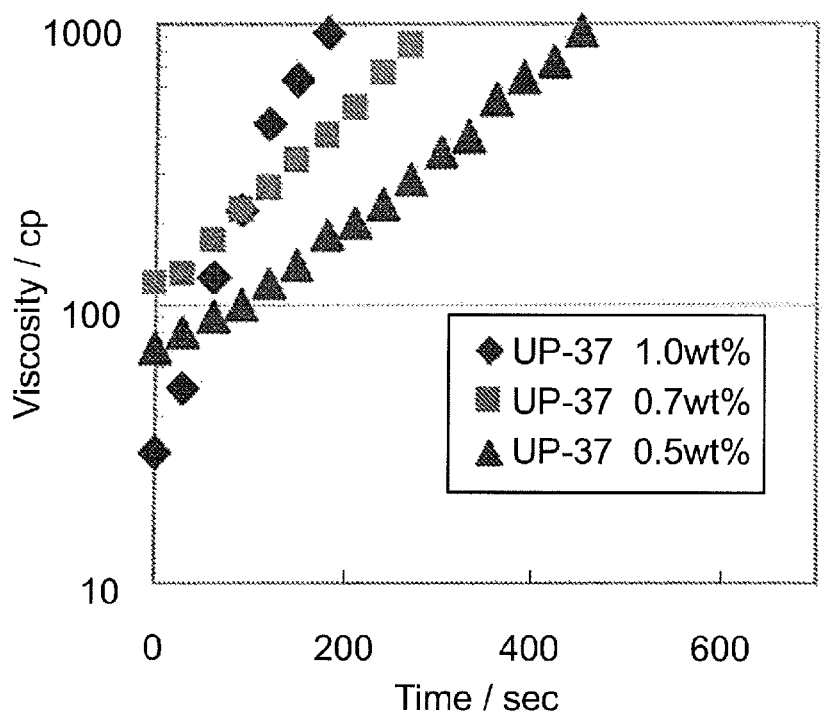
FIG. 4 is a graph showing the relationship between the concentration of agar and the viscosity change, when UP-37 is used.

For comparison, the concentration of the agar was changed in the range of 1.0% by mass to 0.2% by mass. As shown in FIG. 4, when the concentration of the added UP-37 was equal to or higher than 0.5% by mass, the viscosity exceeded 1000 cp within the measurement time of 600 seconds, and good gelation property was exhibited.

Experiment Example 2

Figure 5:
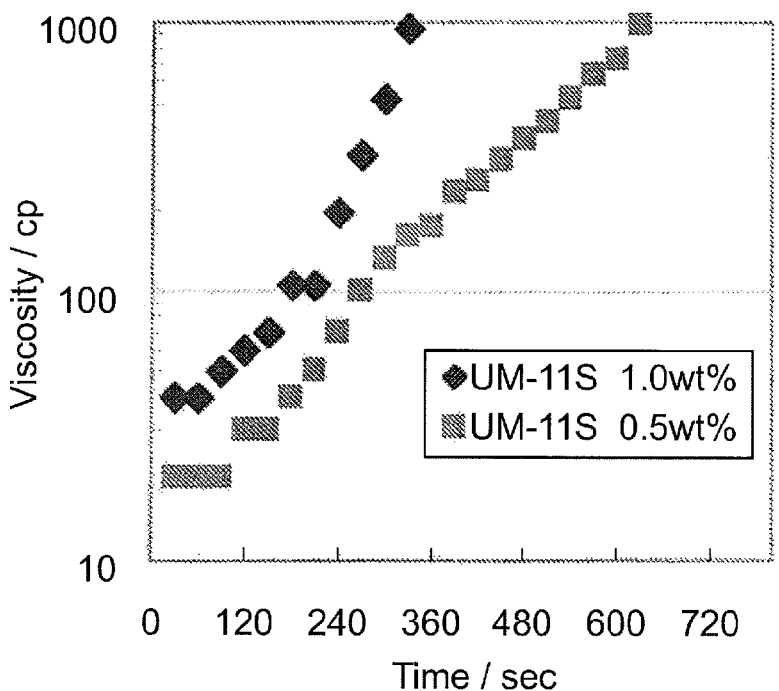
FIG. 5 is a graph showing the relationship between the concentration of agar and the viscosity change, when UM-11S is used.
Figure 6:
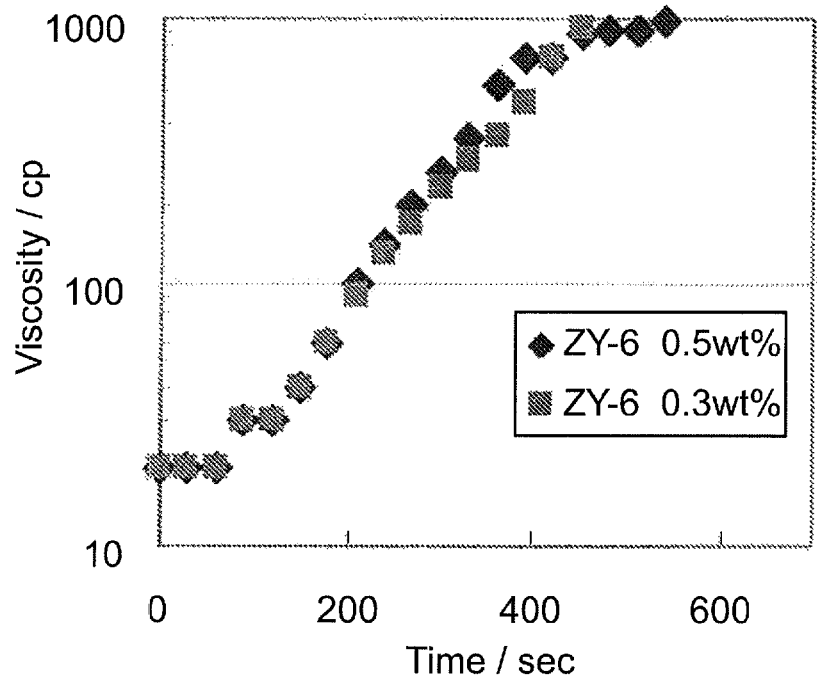
FIG. 6 is a graph showing the relationship between the concentration of agar and the viscosity change, when ZY-6 is used.
Figure 7:
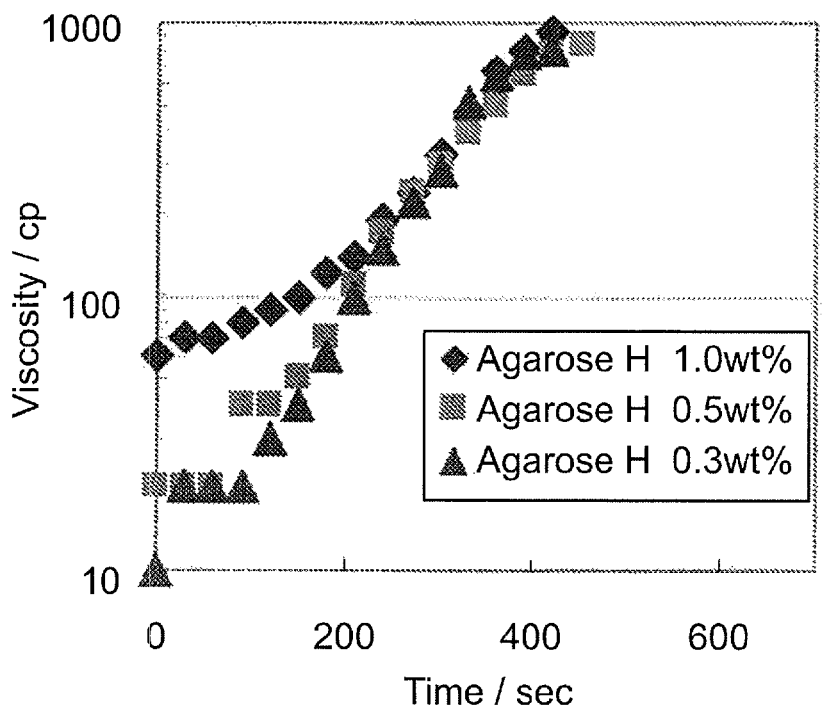
FIG. 7 is a graph showing the relationship between the concentration of agar and the viscosity change, when AGAROSE H is used.

Preparation of aqueous solutions and measurement of viscosity were carried out in the same manner as that in Experiment Example 1, except that INA AGAR UP-37 in Experiment Example 1 was changed to INA AGAR UM-11S, SY-8, ZY-4, ZY-6 (all manufactured by Ina Food Industry Co., Ltd.), AGAROSE H, and AGAROSE S (all manufactured by NIPPON GENE CO., LTD.). The changes in viscosity when INA AGAR UM-11S, ZY-6, and AGAROSE H were used, respectively, are shown in FIG. 5 to FIG. 7. In all cases, the viscosity had a tendency to be increased in a short time as the agar concentration got higher, and when the concentration of agar added was equal to or higher than 0.3% by mass in the case of ZY-4 or when the concentration of agar added was equal to or higher than 0.5% by mass in the case of the others, the viscosity exceeded 1000 cp within the measurement time of 600 seconds, and good gelation property was exhibited.

Example 1

A heat aqueous solution (temperature: 85° C. or higher) containing 0.5% by mass of INA AGAR UP-37 (manufactured by Ina Food Industry Co., Ltd.), 2.5% by mass of polyvinyl alcohol-polyacrylic acid salt copolymer (sodium salt, manufactured by Kuraray Co., Ltd., trade name: KURASTMER AP20), 6.0% by mass of cesium carbonate, and 0.2% by mass of glutaraldehyde was prepared.

The heat aqueous solution was coated on a PET film (T60 manufactured by Toray Industries, Inc., 100 μm thickness) by means of a roll-to-roll method, followed by cooling and drying, to form a membrane. The resulting membrane was converted into a gel membrane in the cooling section where the cooling temperature was set to 8° C., and then the gel membrane was dried in the drying section, without being blown away even under the velocity of dry air of 40 m/s, and thus, a uniform membrane having a thickness of 17 μm was formed. On this dried membrane, the coating and drying process was performed once again, whereby a dried membrane having a film thickness of 35 μm was formed. The resulting substance was wound up into a roll, and then was subjected to heat crosslinking at 120° C., to obtain a carbon dioxide separation membrane.

The mass ratio of each component of the carbon dioxide separation membrane thus obtained in the dried state was as follows.

Polyvinyl alcohol-polyacrylic acid salt: 27.2%
Agar UP-37: 5.4%
Cesium carbonate: 65.2%
Glutaraldehyde: 2.2%

Example 2

On a polyester paper support (manufactured by AWA PAPER MFG. CO., LTD., 70 μm thickness), a heat aqueous solution (temperature: 85° C. or higher) containing 0.5% by mass of INA AGAR UP-37 (manufactured by Ina Food Industry Co., Ltd.), 2.5% by mass of polyvinyl alcohol-polyacrylic acid salt copolymer (sodium salt, manufactured by Kuraray Co., Ltd., trade name: KURASTMER AP20), 6.0% by mass of cesium carbonate, and 0.2% by mass of glutaraldehyde was coated by means of a roll-to-roll method, followed by cooling and drying, to form a membrane. The resulting membrane was converted into a gel membrane in the cooling section where the cooling temperature was set to 8° C., and then the gel membrane was dried in the drying section, without being blown away even under the velocity of dry air of 40 m/s, and thus, a uniform membrane having a thickness of 17 μm was formed. Similarly to Example 1, the coating and drying process was performed once again, the resulting substance was wound up into a roll, and then was subjected to heat crosslinking at 120° C., to obtain a carbon dioxide separation membrane.

Example 3

On a PET film (T60 manufactured by Toray Industries, Inc., 100 μm thickness), a heat aqueous solution (temperature: 85° C. or higher) containing 1.0% by mass of INA AGAR UM-11S (manufactured by Ina Food Industry Co., Ltd.), 2.5% by mass of polyvinyl alcohol-polyacrylic acid salt copolymer (sodium salt, manufactured by Kuraray Co., Ltd., trade name: KURASTMER AP20), and 6.0% by mass of cesium carbonate was coated by means of a roll-to-roll method, followed by cooling and drying (heating), to form a membrane. The resulting membrane was converted into a gel membrane in the cooling section where the cooling temperature was set to 8° C., and thereafter, in the heating section, thickness unevenness occurred at a portion of the membrane under the velocity of dry air of 40 m/s. Similarly to Example 1, the coating and drying process was performed once again, the resulting substance was wound up into a roll, and then was subjected to heat crosslinking at 120° C., to obtain a carbon dioxide separation membrane.

—Evaluation of Gas Separation—

Evaluation was performed in regard to the carbon dioxide gas separation performance, in a manner as described below, using the carbon dioxide separation membranes produced in Examples 1 to 3.

In Example 1 and Example 3, the carbon dioxide separation membrane (diameter: 47 mm) formed on the PET film was gently taken off from the PET film, and using two sheets of PTFE membrane filter (pore diameter: 0.10 μm, manufactured by ADVANTEC CO., LTD.), the membrane was held from the two sides, to produce a permeation test sample.

In Example 2, the carbon dioxide separation membrane was cut, together with the support, into a piece with a diameter of 47 mm, and was put between two sheets of PTFE membrane filter as described above, to produce a permeation test sample.

As the test gas, a mixed gas of $CO_2/H_2$: 10/90 (volume ratio) was supplied at relative humidity of 70%, a flow rate of 100 mL/min, a temperature of 130° C., and total pressure of 3 atm, to each of the samples (effective area: 2.40 $cm^2$) described above, and an Ar gas (flow rate: 90 mL/min) was made to flow on the permeation side. The gas that had been permeated was analyzed by gas chromatography, and the $CO_2$ permeation speed and the separation factor were calculated. The results are shown in Table 2.

Also with regard to the carbon dioxide separation membranes produced in the following Examples 4 to 9 and Comparative Example 1, the carbon dioxide gas separation performance was evaluated in a manner similar to that in Example 1.

Example 4

A heat aqueous solution (temperature: 85° C. or higher) containing 0.5% by mass of INA AGAR UP-37 (manufactured by Ina Food Industry Co., Ltd.), 2.5% by mass of polyvinyl alcohol-polyacrylic acid salt copolymer (sodium salt, manufactured by Kuraray Co., Ltd., trade name: KURASTMER AP20), 6.0% by mass of cesium carbonate, and 0.6% by mass of glycine was prepared.

The heat aqueous solution was coated on a PET film (T60 manufactured by Toray Industries, Inc., 100 μm thickness) by means of a roll-to-roll method, followed by cooling and drying, to form a membrane. The resulting membrane was converted into a gel membrane in the cooling section where the cooling temperature was set to 8° C., and then the gel membrane was dried in the drying section, without being blown away even under the velocity of dry air of 40 m/s, and thus, a uniform membrane was formed. On this dried membrane, the coating and drying process was performed once again, whereby a dried membrane was formed. The resulting substance was wound up into a roll, and then was subjected to heat crosslinking at 120° C., to obtain a carbon dioxide separation membrane.

Example 5

A heat aqueous solution (temperature: 85° C. or higher) containing 0.5% by mass of INA AGAR UP-37 (manufactured by Ina Food Industry Co., Ltd.), 2.5% by mass of polyvinyl alcohol-polyacrylic acid salt copolymer (sodium salt, manufactured by Kuraray Co., Ltd., trade name: KURASTMER AP20), and 1.27% by mass of potassium carbonate was prepared.

The heat aqueous solution was coated on a PET film (T60 manufactured by Toray Industries, Inc., 100 μm thickness) by means of a roll-to-roll method, followed by cooling and drying, to form a membrane. The resulting membrane was converted into a gel membrane in the cooling section where the cooling temperature was set to 8° C., and then the gel membrane was dried in the drying section, without being blown away even under the velocity of dry air of 40 m/s, and thus, a uniform membrane was formed. On this dried membrane, the coating and drying process was performed once again, whereby a dried membrane was formed. The resulting substance was wound up into a roll, and then was subjected to heat crosslinking at 120° C., to obtain a carbon dioxide separation membrane.

Example 6

A heat aqueous solution (temperature: 85° C. or higher) containing 0.5% by mass of INA AGAR UP-37 (manufactured by Ina Food Industry Co., Ltd.), 2.5% by mass of polyvinyl alcohol-polyacrylic acid salt copolymer (sodium salt, manufactured by Kuraray Co., Ltd., trade name: KURASTMER AP20), 1.27% by mass of potassium carbonate, and 1.2% by mass of glycine was prepared.

The heat aqueous solution was coated on a PET film (T60 manufactured by Toray Industries, Inc., 100 μm thickness) by means of a roll-to-roll method, followed by cooling and drying, to form a membrane. The resulting membrane was converted into a gel membrane in the cooling section where the cooling temperature was set to 8° C., and then the gel membrane was dried in the drying section, without being blown away even under the velocity of dry air of 40 m/s, and thus, a uniform membrane was formed. On this dried membrane, the coating and drying process was performed once again, whereby a dried membrane was formed. The resulting substance was wound up into a roll, and then was subjected to heat crosslinking at 120° C., to obtain a carbon dioxide separation membrane.

Example 7

A heat aqueous solution (temperature: 85° C. or higher) containing 0.5% by mass of INA AGAR UP-37 (manufactured by Ina Food Industry Co., Ltd.), 2.5% by mass of polyvinyl alcohol-polyacrylic acid salt copolymer (sodium salt, manufactured by Kuraray Co., Ltd., trade name: KURASTMER AP20), 1.27% by mass of potassium carbonate, and 0.85% by mass of serine was prepared.

The heat aqueous solution was coated on a PET film (T60 manufactured by Toray Industries, Inc., 100 μm thickness) by means of a roll-to-roll method, followed by cooling and drying, to form a membrane. The resulting membrane was converted into a gel membrane in the cooling section where the cooling temperature was set to 8° C., and then the gel membrane was dried in the drying section, without being blown away even under the velocity of dry air of 40 m/s, and thus, a uniform membrane was formed. On this dried membrane, the coating and drying process was performed once again, whereby a dried membrane was formed. The resulting substance was wound up into a roll, and then was subjected to heat crosslinking at 120° C., to obtain a carbon dioxide separation membrane.

Example 8

On a supported PTFE (manufactured by Nakao-Filter Co., Ltd., TETRATEX 7008, 200 μm thickness), a heat aqueous solution (temperature: 85° C. or higher) containing 0.5% by mass of INA AGAR UP-37 (manufactured by Ina Food Industry Co., Ltd.), 2.5% by mass of polyvinyl alcohol-polyacrylic acid salt copolymer (sodium salt, manufactured by Kuraray Co., Ltd., trade name: KURASTMER AP-20), 6.0% by mass of cesium carbonate, and 0.2% by mass of glutaraldehyde was coated by means of a roll-to-roll method, followed by cooling and drying, to form a membrane. The resulting membrane was converted into a gel membrane in the cooling section where the cooling temperature was set to 8° C., and then the gel membrane was dried in the drying section, without being blown away even under the velocity of dry air of 40 m/s, and thus, a uniform membrane having a thickness of 17 μm was formed. Similarly to Example 1, the coating and drying process was performed once again, the resulting substance was wound up into a roll, and then was subjected to heat crosslinking at 120° C., to obtain a carbon dioxide separation membrane.

Comparative Example 1

In a case in which the agar UP-37 was not added in Example 1, the coated film was blown away in the drying section, and thus, a carbon dioxide separation film capable of performing the gas permeability measuring test was not obtained.

Example 9

A heat aqueous solution (temperature: 85° C. or higher) containing 0.5% by mass of INA AGAR UP-37 (manufactured by Ina Food Industry Co., Ltd.), 2.5% by mass of polyvinyl alcohol (manufactured by Kuraray Co., Ltd., KURARAY PVA-117), 6.0% by mass of cesium carbonate, and 0.2% by mass of glutaraldehyde was prepared.

The heat aqueous solution was coated on a PET film (T60 manufactured by Toray Industries, Inc., 100 μm thickness) by means of a roll-to-roll method, followed by cooling and drying, to form a membrane. The resulting membrane was converted into a gel membrane in the cooling section where the cooling temperature was set to 8° C., and then the gel membrane was dried in the drying section, without being blown away even under the velocity of dry air of 40 m/s, and thus, a uniform membrane was formed. On this dried membrane, the coating and drying process was performed once again, whereby a dried membrane was formed. The resulting substance was wound up into a roll, and then was subjected to heat crosslinking at 120° C., to obtain a carbon dioxide separation membrane.

Example 10

A heat aqueous solution (temperature: 85° C. or higher) containing 0.5% by mass of INA AGAR UP-37 (manufactured by Ina Food Industry Co., Ltd.), 2.5% by mass of polyvinyl alcohol (manufactured by Kuraray Co., Ltd., KURARAY PVA-117), 1.27% by mass of potassium carbonate, and 1.2% by mass of glycine was prepared.

The heat aqueous solution was coated on a PET film (T60 manufactured by Toray Industries, Inc., 100 μm thickness) by means of a roll-to-roll method, followed by cooling and drying, to form a membrane. The resulting membrane was converted into a gel membrane in the cooling section where the cooling temperature was set to 8° C., and then the gel membrane was dried in the drying section, without being blown away even under the velocity of dry air of 40 m/s, and thus, a uniform membrane was formed. On this dried membrane, the coating and drying process was performed once again, whereby a dried membrane was formed. The resulting substance was wound up into a roll, and then was subjected to heat crosslinking at 120° C., to obtain a carbon dioxide separation membrane.

The composition of the aqueous solution for forming a carbon dioxide separation membrane and the support which were used in Examples 1 to 10 and Comparative Example 1, are shown in Table 1, and the permeation characteristics of the carbon dioxide separation membrane thus produced are shown in Table 2.

TABLE 1

Composition of Aqueous solution for Forming Carbon Dioxide Separation Membrane

| | Water-absorbing Polymer | | Polysaccharide | | Carbon Dioxide Carrier | | | | Crosslinking Agent | | |
| | | | | | Metal Carbonate | | Amino Acid | | | | |
| | Type | Content (mass %) | Type | Content (mass %) | Type | Content (mass %) | Type | Content (mass %) | Type | Content (mass %) | Support |
|---|---|---|---|---|---|---|---|---|---|---|---|
| Example 1 | PVA-PAA | 2.5 | UP-37 | 0.5 | cesium carbonate | 6.0 | — | 0.0 | glutaraldehyde | 0.2 | PET |
| Example 2 | PVA-PAA | 2.5 | UP-37 | 0.5 | cesium carbonate | 6.0 | — | 0.0 | glutaraldehyde | 0.2 | paper (polyester) |
| Example 3 | PVA-PAA | 2.5 | UM-11S | 1.0 | cesium carbonate | 6.0 | — | 0.0 | — | 0.0 | PET |
| Example 4 | PVA-PAA | 2.5 | UP-37 | 0.5 | cesium carbonate | 6.0 | glycine | 0.6 | — | 0.0 | PET |
| Example 5 | PVA-PAA | 2.5 | UP-37 | 0.5 | potassium carbonate | 1.27 | — | 0.0 | — | 0.0 | PET |
| Example 6 | PVA-PAA | 2.5 | UP-37 | 0.5 | potassium carbonate | 1.27 | glycine | 1.2 | — | 0.0 | PET |
| Example 7 | PVA-PAA | 2.5 | UP-37 | 0.5 | potassium carbonate | 1.27 | serine | 0.85 | — | 0.0 | PET |
| Example 8 | PVA-PAA | 2.5 | UP-37 | 0.5 | cesium carbonate | 6.0 | — | 0.0 | glutaraldehyde | 0.2 | PTFE |
| Comparative Example 1 | PVA-PAA | 2.5 | — | 0.0 | cesium carbonate | 6.0 | — | 0.0 | glutaraldehyde | 0.2 | PET |
| Example 9 | PVA | 2.5 | UP-37 | 0.5 | cesium carbonate | 6.0 | — | 0.0 | glutaraldehyde | 0.2 | PET |
| Example 10 | PVA | 2.5 | UP-37 | 0.5 | potassium carbonate | 1.27 | glycine | 1.2 | — | 0.0 | PET |

TABLE 2

| | Permeation Characteristics | | Presence or Absence of Unevenness in Film |
| | Permeation Speed Q *1 | Separation Factor α *2 | thickness and Defects in Membrane State |
|---|---|---|---|
| Example 1 | 187 | 538 | absence |
| Example 2 | 49 | 81 | absence |
| Example 3 | 142 | 388 | presence |
| Example 4 | 225 | 657 | absence |
| Example 5 | 16 | 64 | absence |
| Example 6 | 143 | 372 | absence |
| Example 7 | 43 | 136 | absence |
| Example 8 | 143 | 423 | absence |
| Comparative Example 1 | unmeasurable | unmeasurable | membrane is not formed |
| Example 9 | 103 | 352 | absence |
| Example 10 | 97 | 304 | absence |

Note)
*1 Unit of permeation speed: $1 \times 10^{-6}$ cm$^3$ (STP)/(s · cm$^2$ · cmHg)
*2 $\alpha = Q(CO_2)/Q(H_2)$ As shown in Tables 1 and 2, in Examples 1 to 10, by the inclusion of a polysaccharide, it was possible to produce a carbon dioxide separation membrane having carbon dioxide permeation characteristics, even by means of roll-to-roll.

Further, in Examples 6 and 7, a carbon dioxide separation membrane was prepared in a manner similar to that in Example 5, except that an amino acid was added; however, in Examples 6 and 7, both the carbon dioxide permeation speed and the separation factor were enhanced as compared with those in Example 5, and especially, in Example 6, in which glycine was added, both the carbon dioxide permeation speed and the separation factor were remarkably enhanced.

The disclosures of Japanese Patent Application No. 2011-004274, Japanese Patent Application No. 2011-068245, Japanese Patent Application No. 2011-167488, and Japanese Patent Application No. 2011-250968 are incorporated by reference herein in its entirety.

All publications, patent applications, and technical standards mentioned in this specification are herein incorporated by reference to the same extent as if such individual publication, patent application, or technical standard was specifically and individually indicated to be incorporated by reference.

The invention claimed is:

1. A composition for forming a carbon dioxide separation membrane, the composition comprising:
a mixture containing:
a binder consisting of a hydrophilic polymer,
a carbon dioxide carrier, and
a polysaccharide, wherein the polysaccharide is agar and a content of the polysaccharide is from 0.3% by mass to 5% by mass, with respect to the composition.

2. The composition for forming a carbon dioxide separation membrane according to claim 1, wherein a viscosity of the composition, when measured in accordance with JIS Z8803 using a B type viscometer while cooling the surroundings of a container having the composition contained therein with 0° C. ice water, reaches 1000 cp or higher within 700 seconds, after the initiation of cooling.

3. The composition for forming a carbon dioxide separation membrane according to claim 1, wherein the water-absorbing polymer is a polyvinyl alcohol-polyacrylic acid salt copolymer.

4. The composition for forming a carbon dioxide separation membrane according to claim 1, wherein the carbon dioxide carrier is an alkali metal carbonate.

5. The composition for forming a carbon dioxide separation membrane according to claim 1, wherein the carbon dioxide carrier is a compound containing at least one selected from the group consisting of cesium, rubidium, and potassium.

6. The composition for forming a carbon dioxide separation membrane according to claim 1, further comprising an amino acid.

7. The composition for forming a carbon dioxide separation membrane according to claim 6, wherein the amino acid is at least one selected from the group consisting of arginine, lycine, aspartic acid, glutamic acid, glutamine, histidine, proline, serine, threonine, glycine, alanine, diaminopropionic acid, and taurine.

8. The composition for forming a carbon dioxide separation membrane according to claim 6, wherein the amino acid is at least one selected from the group consisting of glycine and serine.

9. A process for producing a carbon dioxide separation membrane, the process comprising:
preparing the composition for forming a carbon dioxide separation membrane according to claim 1;
coating the composition on a support;
cooling the coated film obtained in the coating, to obtain a gel membrane;
drying the gel membrane to obtain a dried membrane; and
crosslinking the dried membrane to obtain a carbon dioxide separation membrane.

10. The process for producing a carbon dioxide separation membrane according to claim 9, wherein an area of the support is 30 cm$^2$ or more.

11. The process for producing a carbon dioxide separation membrane according to claim 9, wherein the support is belt-shaped and sent off from a let-off roll, and while conveying the support, the coating, the cooling, and the drying are performed in order and then, before or after the crosslinking, the dried membrane or the carbon dioxide separation membrane is wound onto a take-up roll.

12. The process for producing a carbon dioxide separation membrane according to claim 11, wherein the support is conveyed at a conveying speed of 1 m/min or higher from the coating to the drying.

13. The process for producing a carbon dioxide separation membrane according to claim 9, wherein the gel membrane is formed to have a thickness of 10 µm or more.

14. The process for producing a carbon dioxide separation membrane according to claim 9, wherein the cooling is performed at a wet bulb temperature of 35° C. or lower.

15. A carbon dioxide separation membrane comprising:
a support; and
on the support, a layer formed from the composition for forming a carbon dioxide separation membrane according to claim 1.

16. The carbon dioxide separation membrane according to claim 15, wherein the carbon dioxide carrier comprises a compound containing at least one selected from the group consisting of cesium, rubidium, and potassium.

17. The carbon dioxide separation membrane according to claim 15, further comprising an amino acid.

18. The carbon dioxide separation membrane according to claim 17, wherein the amino acid is at least one selected from the group consisting of glycine and serine.

19. The carbon dioxide separation membrane according to claim 16, wherein a compound containing cesium is included, as the carbon dioxide carrier, in an amount of 50% by mass or more with respect to the carbon dioxide separation membrane.

20. The carbon dioxide separation membrane according to claim 16, wherein a compound containing potassium is included, as the carbon dioxide carrier, in an amount of 15% by mass or more with respect to the carbon dioxide separation membrane.

21. A carbon dioxide separation apparatus equipped with the carbon dioxide separation membrane according to claim 15.

22. The composition for forming a carbon dioxide separation membrane according to claim 1, wherein:
the hydrophilic polymer is at least one polymer selected from the group consisting of polyvinyl alcohols, polyacrylic acids, polyethylene oxides, water-soluble celluloses, starches, alginic acids, chitins, polysulfonic acids, polyhydroxy methacrylates, polyvinyl pyrrolidones, poly-N-vinyl acetamides, polyacrylamides, polyethyleneimines, polyallylamines, polyvinylamines and copolymers thereof, and
the carbon dioxide carrier is: (i) at least one compound selected from the group consisting of alkali metal carbonates, alkali metal hydrogencarbonates, alkali metal hydroxides, ammonia, ammonium salts, water-soluble straight-chain or cyclic amines, water-soluble amine salts of straight-chain or cyclic amines, and water-soluble ammonium salts of straight-chain or cyclic amines, or (ii) an aqueous solution obtained by adding a multidentate ligand that forms a complex with an alkali metal ion to an aqueous solution containing at least one selected from the group consisting of alkali metal carbonates, alkali metal hydrogencarbonates and alkali metal hydroxides, or (iii) any combination of (i) and (ii).

* * * * *